United States Patent

Mori et al.

(10) Patent No.: US 11,555,274 B2
(45) Date of Patent: Jan. 17, 2023

(54) METHOD FOR IMPROVING EFFICIENCY OF STEAM HEATING, AND PAPERMAKING METHOD

(71) Applicant: KURITA WATER INDUSTRIES LTD., Tokyo (JP)

(72) Inventors: Shintaro Mori, Tokyo (JP); Shogo Ujiie, Tokyo (JP); Qian Lin, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 160 days.

(21) Appl. No.: 16/640,272

(22) PCT Filed: Jul. 30, 2018

(86) PCT No.: PCT/JP2018/028433
§ 371 (c)(1),
(2) Date: Feb. 19, 2020

(87) PCT Pub. No.: WO2019/058765
PCT Pub. Date: Mar. 28, 2019

(65) Prior Publication Data
US 2020/0362514 A1 Nov. 19, 2020

(30) Foreign Application Priority Data

Sep. 21, 2017 (JP) .............................. JP2017-181476

(51) Int. Cl.
*D21F 5/10* (2006.01)
*F26B 21/00* (2006.01)
(Continued)

(52) U.S. Cl.
CPC ................ *D21F 5/10* (2013.01); *C23F 11/08* (2013.01); *C23F 11/141* (2013.01); *F26B 21/005* (2013.01)

(58) Field of Classification Search
CPC .......... D21F 5/10; C23F 11/08; C23F 11/141; F26B 21/005; F26B 23/001; F26B 13/183; F26B 13/18; Y02P 70/10
See application file for complete search history.

(56) References Cited

U.S. PATENT DOCUMENTS 4,276,089 A * 6/1981 Moran ..................... C23F 11/10
106/14.12
4,284,532 A 8/1981 Leikhim et al.
(Continued)

FOREIGN PATENT DOCUMENTS

CA 1246270 A 12/1988
CA 2800545 A1 11/2011
(Continued)

OTHER PUBLICATIONS

PCT/ISA/210, "International Search Report for International Application No. PCT/JP2018/028433," dated Oct. 30, 2018.
(Continued)

*Primary Examiner* — Pamela H Weiss
(74) *Attorney, Agent, or Firm* — Manabu Kanesaka

(57) ABSTRACT

A method for improving the heating efficiency of steam wherein a polyamine represented by the following general formula (1) is caused to be present in a steam system to be used for heating. $R^1-[NH-(CH_2)_m]_n-NH_2$ . . . (1) wherein $R^1$ represents a saturated or unsaturated hydrocarbon group having 10 to 22 carbon atoms; m is an integer of 1 to 8, and n is an integer of 1 to 7; and when n is 2 or more, a plurality of $NH-(CH_2)_m$ may be identical or different.

6 Claims, 1 Drawing Sheet

(51) Int. Cl.
*C23F 11/14* (2006.01)
*C23F 11/08* (2006.01)

(56) References Cited

U.S. PATENT DOCUMENTS

| | | | |
|---|---|---|---|
| 4,562,042 A * | 12/1985 | Moran | C23F 11/02 |
| | | | 422/13 |
| 5,232,815 A | 8/1993 | Browne et al. | |
| 5,508,141 A | 4/1996 | Hart et al. | |
| 5,849,220 A | 12/1998 | Batton et al. | |
| 8,071,523 B2 | 12/2011 | Kany et al. | |
| 8,227,398 B2 | 7/2012 | Kany et al. | |
| 8,906,202 B2 | 12/2014 | Grattan et al. | |
| 2002/0148584 A1* | 10/2002 | Edwards | D21F 5/182 |
| | | | 162/204 |
| 2008/0108539 A1 | 5/2008 | Kany et al. | |
| 2010/0269996 A1* | 10/2010 | Grattan | F22B 37/025 |
| | | | 162/198 |
| 2012/0065120 A1 | 3/2012 | Kany et al. | |
| 2013/0119303 A1 | 5/2013 | Hater et al. | |
| 2016/0002793 A1* | 1/2016 | Esposito | B08B 3/08 |
| | | | 134/2 |
| 2020/0173739 A1 | 6/2020 | Ujiie et al. | |

FOREIGN PATENT DOCUMENTS

| | | | | |
|---|---|---|---|---|
| EP | 1045045 A1 * | 10/2000 | | C23F 11/10 |
| EP | 3767216 A1 | 1/2021 | | |
| JP | S56-095997 A | 8/1981 | | |
| JP | S59-061299 U | 4/1984 | | |
| JP | S60-001259 A | 1/1985 | | |
| JP | S60-89583 A | 5/1985 | | |
| JP | H04-314877 A | 11/1992 | | |
| JP | H10-60675 A | 3/1998 | | |
| JP | H11-335877 A | 12/1999 | | |
| JP | H11-335878 A | 12/1999 | | |
| JP | 2000-297389 A | 10/2000 | | |
| JP | 2007-530785 A | 11/2007 | | |
| JP | 2008-184680 A | 8/2008 | | |
| JP | 2011-012921 A | 1/2011 | | |
| JP | 2011012921 A * | 1/2011 | | F26B 13/183 |
| JP | 2012-524882 A | 10/2012 | | |
| JP | 2015-174040 A | 10/2015 | | |
| JP | 2017-119893 A | 7/2017 | | |
| WO | 2017/115571 A1 | 7/2017 | | |

OTHER PUBLICATIONS

Japan Patent Office, "Notice of Reasons for Refusal for Japanese Patent Application No. 2017-181476," dated Oct. 23, 2018.
Japan Patent Office, "Notice of Reasons for Refusal for Japanese Patent Application No. 2017-181476," dated Jun. 18, 2019.
Europe Patent Office, "Search Report for European Patent Application No. 18858092.2," dated May 18, 2021.
Japan Patent Office, "Opposition to Japanese Patent No. 6735717," dated Feb. 10, 2021.
"Technical Guidance Document: Application of Film Forming Amines in Fossil, Combined Cycle, and Biomass Power Plants," IAPWS TGD8-16, International Association for the Properties of Water and Steam, Sep. 2016, Dresden, Germany.
Bursik, A. et al., "All-Volatile Treatment with Film Forming Amines—A First Suggestion for an Application Guidance," PowerPlant Chemistry (PPChem), 2015, p. 342-353, vol. 17, No. 6, Waesseri GmbH.
Ryzhenkov, A. V. et al., "Prospects for the application of film-forming amines in power engineering," Surface and Contact Mechanics including Tribology XII, WIT Transactions on Engineering Sciences, 2015, p. 127-137, vol. 91, WIT Press.
Japan Patent Office, "Office Action for Japanese Patent Application No. 2019-132978," dated Aug. 24, 2021.
Betz, Handbook of Industrial Water Conditioning, 7th Edition, Betz Laboratories, Inc., 1982, p. 154-155.
China National Intellectual Property Administration, "Office Action for Chinese Patent Application 201880054216.2," dated Jan. 13, 2022.
Japan Patent Office, "Office Action for Japanese Patent Application 2019-132978," dated Apr. 5, 2022.

* cited by examiner

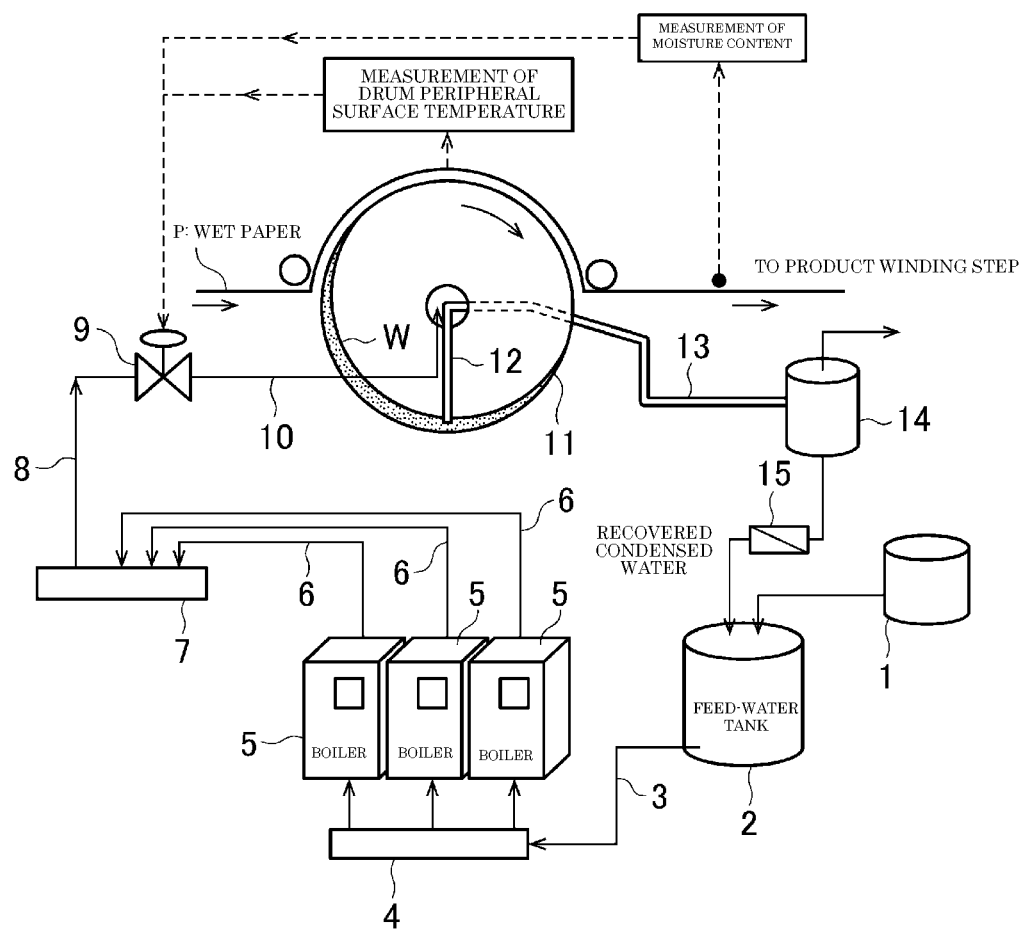

METHOD FOR IMPROVING EFFICIENCY OF STEAM HEATING, AND PAPERMAKING METHOD

TECHNICAL FIELD

The present invention relates to a method for improving the heating efficiency of steam in a heating step of heating a material to be heated by steam via a metallic material. The present invention relates further to a papermaking method of adopting the heating efficiency-improving method and improving the production efficiency in a papermaking facility.

BACKGROUND ART

In papermaking factories, food and beverage-manufacturing factories and the like, products are heated by steam for treatments of drying, concentrating or sterilizing thereof. For example, in papermaking facilities, wet paper having a moisture content of about 50% is dried to have a moisture content of about 5 to 10% by a steam dryer equipped with a rotary drum.

FIG. 1 is a system diagram illustrating a wet paper drying facility using a Yankee dryer (a dryer composed of one large-diameter cast iron cylinder) as a steam dryer. Feed-water is supplied to boilers 5 via a makeup water apparatus 1, a feed-water tank 2, a pipe 3 and a feed-water header 4. Water vapor generated in the boilers 5 is supplied into a drum 11 of the Yankee dryer via a water vapor piping 6, a water vapor header 7, a pipe 8, a flow rate regulating valve 9 and a pipe 10.

The drum 11 is rotationally driven in the clockwise direction in FIG. 1. Wet paper P is brought into contact with the peripheral surface of the drum 11 and dried, separated off the peripheral surface, and thereafter fed to a product winding step. The moisture content of the dried paper and the temperature of the drum peripheral surface are measured by sensors, and based on the measurements, the water vapor flow rate is regulated by the valve 9.

Condensed water W generated by condensation of water vapor in the drum 11 is fed to a flash tank 14 via a siphon pipe 12 and a pipe 13, and returned to the feed-water tank 2 via a strainer 15. In the drum 11, the condensed water W is pressed against the inner peripheral surface of the drum 11 by a centrifugal force accompanying the rotation of the drum 11 to be lifted in the rotation direction of the drum 11. Thereby, a water film is formed on the inner peripheral surface of the drum 11.

The drying step of the paper in the papermaking facility involves gradually raising the temperature of moisture and pulp contained in the wet paper to evaporate water. A needed quantity of heat is imparted mainly by steam in individual dryers so that the paper is dried to a specified moisture content at the place (dry end) where the paper is separated off the peripheral surface of the drum 11.

In order to raise the amount of paper to be produced by raising the drying efficiency of the wet paper, it is needed that the condensed water W generated in the drum 11 is efficiently discharged to reduce the water film.

As a countermeasure thereto, a method of causing condensed water film accumulated in a dryer drum to be ununiform by reducing the drum rotation rate to make the papermaking rate low, installing protrusions called spoiler bars in the drum, or otherwise is carried out. The lowered papermaking rate, however, leads to a reduction of the production amount per unit time. The installation of the spoiler bars involves facility renewal and then engineering work.

In order to suppress the formation of a condensed water film in a drum without using these methods, there has been proposed a method of adding a long-chain aliphatic amine such as octadecylamine as a contact angle-increasing agent for increasing the contact angle of the drum inner peripheral surface with water (Patent Literature 1).

The long-chain aliphatic amine proposed in Patent Literature 1 is a straight long-chain aliphatic amine represented by the general formula: $CH_3(CH_2)_mNH_2$ (m=9 to 23). Patent Literature 1 makes no disclosure of a polyamine to be used in the present invention.

PTL1: JP 2011-12921 A

By the method of Patent Literature 1, the improvement of the papermaking rate and the improvement of the production amount of paper due to the effect of suppressing formation of a condensed water film in a drum of a steam dryer can be achieved. However, clogging occurs in the system particularly when chemical agents are excessively added and the cleaning frequency becomes high.

SUMMARY OF INVENTION

An object of the present invention is to provide a method for effectively improving the heating efficiency of steam without involving a reduction in the production efficiency and a large-scale facility renewal in a heating step of heating a material to be heated by the steam via a metallic material. A further object of the present invention is to provide a papermaking method for improving the production efficiency in a papermaking facility by adopting the above heating efficiency-improving method.

Solution to Problem

The present inventors have found that a specific polyamine provides no clogging problem and can reduce the cleaning frequency more greatly than the long-chain aliphatic amine proposed in Patent Literature 1. It has also been found that by causing the polyamine to be present in a steam system, the heating efficiency of a steam dryer can be improved without involving the reduction of the production efficiency including a reduction of the rotation rate of a drum of the steam dryer in a papermaking step, and without involving a large-scale facility renewal.

The present invention has the following gist.

[1] A method for improving the heating efficiency of steam in a heating step of heating a material to be heated by the steam via a metallic material, wherein a polyamine represented by the following general formula (1) is caused to be present in a system of the steam:

$$R^1—[NH—(CH_2)_m]_n—NH_2 \qquad (1)$$

wherein $R^1$ represents a saturated or unsaturated hydrocarbon group having 10 to 22 carbon atoms; m is an integer of 1 to 8, and n is an integer of 1 to 7; and when n is 2 or more, a plurality of $NH—(CH_2)_m$ may be identical or different.

[2] The method for improving the heating efficiency of steam according to [1], wherein the metallic material is rotating.

[3] The method for improving the heating efficiency of steam according to [1] or [2], wherein the heating step is a step of heating the material to be heated by a steam dryer; and the polyamine is added to a place, of a steam pipe or a steam header for supplying steam to the steam dryer, right before the steam dryer.

[4] The method for improving the heating efficiency of steam according to any one of [1] to [3], wherein the polyamine is added so that the concentration of the polyamine in the steam becomes 0.01 to 10 ppm.

[5] A papermaking method comprising using a method for improving the heating efficiency of steam according to any one of [1] to [4] to thereby improve the heating efficiency of steam, in a steam dryer installed in a papermaking facility, wherein the amount of the steam to be supplied to the steam dryer is adjusted based on the amount of papermaking in the papermaking facility and the amount of the steam used in the steam dryer.

Advantageous Effects of Invention

According to the present invention, the heating efficiency of steam can be more effectively improved by suppressing formation of a condensed water film without involving a reduction in the production efficiency and a large-scale facility renewal and without raising the cleaning frequency due to clogging in the application system in a heating step of heating a material to be heated by steam via a metallic material, preferably in a heating and drying step.

According to the present invention, the formation of a water film on the surface of the metallic material is prevented or suppressed, and the heating efficiency is thereby improved.

In one aspect of the present invention, the formation of a condensed water film in a drum of a steam dryer can be suppressed only by adopting simply chemically injecting a polyamine in a steam pipe or a steam header for improvement of the heating efficiency in the steam dryer of a papermaking facility, without reducing the rotation rate of the drum nor installing a member for preventing formation of the condensed water film. Further the thickness of the condensed water film formed can be made thinner; the drying efficiency of a wet paper can be raised to greatly improve the production efficiency; and the pressure of steam to be supplied can be reduced, which can contribute to the energy saving.

BRIEF DESCRIPTION OF DRAWINGS

FIG. 1 is a system diagram illustrating one example of a wet paper drying facility.

DESCRIPTION OF EMBODIMENTS

Hereinafter, an embodiment of the present invention will be described in detail.

<Polyamine>

A polyamine to be used in the present invention is represented by the following general formula (1).

$$R^1-[NH-(CH_2)_m]_n-NH_2 \quad (1)$$

wherein $R^1$ represents a saturated or unsaturated hydrocarbon group having 10 to 22 carbon atoms; m is an integer of 1 to 8, and n is an integer of 1 to 7; and when n is 2 or more, a plurality of $NH-(CH_2)_m$ may be identical or different.

The saturated or unsaturated hydrocarbon group of $R^1$ may be of a straight-chain or a branched-chain, or cyclic. $R^1$ includes an alkyl group, an alkenyl group, an alkadienyl group and an alkynyl group. $R^1$ is preferably a straight-chain alkyl group or a straight-chain alkenyl group. The number of carbon atoms of $R^1$ is preferably 15 to 22.

The integer m is preferably 2 to 6 from the viewpoint of corrosion suppression. The $(CH_2)_m$ group includes a methylene group, an ethylene group (dimethylene group), a propylene group (trimethylene group) and a butylene group (tetramethylene group), and is preferably a propylene group.

The integer n is preferably 1 to 3 from the viewpoint of corrosion suppression.

Specific examples of the polyamine include dodecylaminomethyleneamine, dodecylaminodimethyleneamine, dodecylaminotrimethyleneamine(N-stearyl-1,3-propanediamine) and tetradecyl, hexadecyl, and octadecyl compounds corresponding to these polyamines, and octadecenylaminotrimethyleneamine, octadecenylaminodi-(trimethylamino)-trimethyleneamine and palmitylaminotrimethyleneamine. A polyamine to be used in the present invention is preferably N-oleyl-1,3-propanediamine (that is, N-octadecenylpropane-1,3-diamine), which is easily available in a sufficient purity.

The polyamine may be dissolved in a solvent such as methanol, ethanol or isopropanol, and added to steam or feed-water. It is preferable that the polyamine is made into an aqueous emulsion by using an emulsifier, and added to steam or feed-water. The emulsifier is preferably one having a high HLB (hydrophilic-lipophilic balance) value. The HLB of the emulsifier is preferably 12 to 16 and more desirably 13 to 15.

Examples of the emulsifier include polyoxyethylenealkylamine, and preferable is a polyoxyethylenealkylamine whose alkyl group has 10 to 18 carbon atoms.

As other emulsifiers, fatty acid alkali metal salts, particularly saturated or unsaturated fatty acid alkali metal salts having 8 to 24, particularly 10 to 22, carbon atoms can suitably be used. Specific examples thereof include sodium or potassium salts of saturated or unsaturated fatty acids such as capric acid, lauric acid, myristic acid, palmitic acid, stearic acid, arachic acid, behenic acid, oleic acid, erucic acid, linoleic acid and linolenic acid. As the fatty acid alkali metal salts, sodium salts or potassium salts of fatty acids produced from edible fat and oil can also be preferably used. As the fatty acid alkali metal salts, suitable are alkali metal salts of fatty acids containing 25% by weight or higher of at least one selected from the group consisting of, particularly, unsaturated fatty acids having 14 to 22 carbon atoms, for example, oleic acid, erucic acid, linoleic acid and linolenic acid. As the emulsifier, besides, esters of glycerol with the above-mentioned fatty acids can also be preferably used. Esters with stearic acid can be used especially preferably.

The emulsifiers may be used singly or in combinations of two or more.

When the polyamine is made into an aqueous emulsion by using an emulsifier such as a fatty acid alkali metal salt, it is suitable that the blend proportion of the polyamine to the emulsifier is, in weight ratio (polyamine/emulsifier), 40/1 to 1/1, especially about 20/1 to 2/1.

The polyamines may be used singly or in combinations of two or more.

A long-chain aliphatic amine such as octadecylamine or oleylamine may be used in combination in a range which does not generate clogging.

It is preferable that the polyamine is caused to be present in a proportion of 0.01 to 10 ppm, especially 0.1 to 1 ppm, based on the amount of steam. When the amount of the polyamine is smaller than this range, the effect of suppressing the formation of the condensed water film and the effect of improving the heating efficiency due to the polyamine cannot sufficiently be attained. When the amount of the polyamine is larger than this range, there arises a risk that a tacky adhered material is produced in the system.

Here, "ppm" is a proportion in weight of the polyamine to water corresponding to the amount of steam, and is equivalent to "mg/L-water". The amounts of a later-described neutralizing amine and deoxidizing agent to be added are similarly defined.

<Other Chemical Agents>

Together with the above-mentioned polyamine, other chemical agents may be concurrently used. For example, a neutralizing amine having a pH-adjusting function may be concurrently used. The concurrent use of the neutralizing amine enables attaining the effect of reducing the corrosion rate of the steam drum and steam condensing piping before and after the drum.

As the neutralizing amine, volatile amines such as ammonia, monoethanolamine (MEA), cyclohexylamine (CHA), morpholine (MOR), diethylethanolamine (DEEM, monoisopropanolamine (MIPA), 3-methoxypropylamine (MOPA), 2-amino-2-methyl-1-propanol (AMP) and diglycolamine (DGA) can be used. The neutralizing amines may be used singly or in combinations of two or more.

In place of the neutralizing amine, pH adjustment may be carried out by ammonia originated from thermal decomposition of the following deoxidizing agent.

In the case of the concurrent use of the neutralizing amine, it is preferable that the amount of the neutralizing amine to be added is caused to be 0.1 to 50 ppm, especially 5 to 15 ppm, based on the amount of steam, though depending on the amount of the polyamine to be used, the kind of material to be heated, the type of the steam dryer, and the like.

A deoxidizing agent may be used concurrently together with the polyamine.

The concurrent use of the deoxidizing agent enables attaining the effect of reducing corrosion of the steam drum and the like as in the case of the neutralizing amine.

As the deoxidizing agent, hydrazine derivatives such as hydrazine and carbohydrazide can be used. As non-hydrazine-based deoxidizing agents, carbohydrazide, hydroquinone, 1-aminopyrrolidine, 1-amino-4-methylpiperazine, N,N-diethylhydroxylamine, isopropylhydroxylamine, erythorbic acid or salts thereof, ascorbic acid or salts thereof, tannic acid or salts thereof, saccharides and sodium sulfite can also be used. The deoxidizing agents may be used singly or in combinations of two or more.

In the case of the concurrent use of the deoxidizing agent, it is preferable that the amount of the deoxidizing agent to be added is caused to be 0.01 to 3 ppm, especially 0.05 to 1 ppm, based on the amount of steam, though depending on the amount of the polyamine to be used, the kind of material to be heated, the type of the steam dryer, and the like.

The above-mentioned chemical agents to be concurrently used may be added to the same place as for the polyamine, or may be added to a different place. In the case of adding two or more chemical agents to the same place, the chemical agents to be added may be previously mixed and then added, or may be added separately.

<Application to a Steam Dryer>

When the material to be heated is heated by steam via a metallic material, the above-mentioned polyamine, and further, as required, other chemical agents such as the neutralizing amine and the deoxidizing agent are caused to be present in the steam system.

The metallic material is preferably one excellent in the durability and high in the heat-transfer efficiency. The metallic material may be an iron-based material or a copper-based material.

The material to be heated is not especially limited. The present invention is suitable for heating and drying of wet paper in papermaking facilities. Further, the present invention is suitable for heating and drying wet paper having gone out from press and water-squeeze sections in production facilities for household raw paper materials for tissue paper, toilet paper, kitchen paper and paper diapers, one side-glazed packing paper, and the like.

The present invention can also be applied to a heating or cooling step using steam in usual heat exchangers like plate type heat exchangers.

The above-mentioned polyamine suppresses the formation of the condensed water film. Therefore, the method of the present invention is suitably applied to a steam dryer. In a steam dryer, when the material to be heated is steam heated, since the metallic material interposed between the material to be heated and the steam rotates, a condensed water film is easily formed by a centrifugal force. According to the present invention, this formation of the condensed water film is prevented or suppressed. The steam dryer includes various types of rotary papermaking machine dryers such as the Yankee dryer illustrated in FIG. 1 and multi-cylinder type dryers.

In the case of adding the polyamine to the steam dryer, the addition place is not especially limited. The polyamine is added preferably to a steam piping or a steam header right before a dryer drum. Thereby, the exhaustion of the polyamine before the polyamine reaches the steam dryer is prevented, and the needed amount of the polyamine to be added is reduced. However, the polyamine may be added to the feed-water of the steam generating facility.

Addition of the polyamine to be used in the present invention is not limited to the steam dryer, and may be to steam of a black liquor evaporator of the papermaking facility. The black liquor evaporator is a concentrator for concentrating a dilute black liquor to a concentration of from 20% to about 70 to 80%, and the concentrate is used as a fuel for a recovery boiler. In the black liquor evaporator, steam and the dilute black liquor exchange heat in a plate type heat exchanger, and condensed water generated is transferred along on plates of the heat exchanger, and discharged. By adding the polyamine to steam of the black liquor evaporator, the formation of condensed water films on plate surfaces is suppressed, improving the heating efficiency.

The method for improving the heating efficiency of steam according to the present invention is suitably applied to a steam dryer installed in a papermaking facility. In this case, it is preferable that the amount of steam to be supplied to the steam dryer is adjusted based on the amount of papermaking in the papermaking facility and the amount of steam used in the steam dryer. By adjusting the amount of steam according to the needed amount thereof, the steam consumption unit can be reduced and the production efficiency can be raised. Further, with the amount of steam to be supplied to the steam dryer being fixed, the amount of papermaking can be improved.

EXAMPLES

Hereinafter, Examples and Comparative Example will be described.

In the below, the steam consumption unit was calculated as a proportion of an amount of steam used (t) to an amount of production (amount of papermaking) (t) of paper excluding paper having generated defects.

Example 1

In the papermaking and drying facility illustrated in FIG. 1, the drum diameter of the Yankee dryer was set to 3 m; the pressure of water vapor supplied was set at 0.6 MPa; the amount of the water vapor supplied was set at about 900 kg/h; and the amount of the water vapor supplied to the Yankee dryer was controlled by a flow rate regulating valve 9 so that the outer surface temperature of the drum became 100° C. and the moisture content of a product (paper) after drying became 20 to 30%.

As the polyamine, N-octadecenylpropane-1,3-diamine was used.

The polyamine was emulsified with polyoxyethylenecocoamine and added. The amount of the polyoxyethylenecocoamine blended was 15 parts by weight per 100 parts by weight of the polyamine.

Although the steam consumption unit was 2.94 before addition of the polyamine, when the polyamine was added to the steam header 7 so that the amount thereof became 0.4 ppm to the amount of the steam, the steam consumption unit after the addition thereof was improved to 2.81. During the test, no clogging of the strainer of the papermaking and drying facility occurred.

Example 2

The steam consumption units before and after the addition of the chemical agents, and presence/absence of clogging of the strainer were examined as in Example 1, except for that 3.2 ppm of MEA as a neutralizing amine and 2.2 ppm of DEEA were concurrently added together with the polyamine in Example 1. Results are shown in Table 1.

Comparative Example 1

The steam consumption units before and after the addition of the chemical agents, and presence/absence of clogging of the strainer were examined as in Example 1, except for that octadecylamine was used in place of N-octadecenylpropane-1,3-diamine and added in 0.1 ppm to the amount of steam; and 3.8 ppm of AMP as a neutralizing amine was added, in Example 1. Results are shown in Table 1.

In Table 1, N-octadecenylpropane-1,3-diamine is described as "polyamine". The reduction rate of the steam consumption unit after the addition of the chemical agents to a steam consumption unit therebefore is together indicated as "steam consumption unit reduction rate (%)" in Table 1.

The present invention has been described in detail by way of the specific aspect, but it is obvious to those skilled in the art that various changes and modifications may be made without departing from the aim and the scope of the present invention.

The present application is based on Japanese Patent Application No. 2017-181476, filed on Sep. 21, 2017, the entire of which is incorporated by reference herein.

REFERENCE SIGNS LIST

4 FEED-WATER HEADER
5 BOILER
7 WATER VAPOR HEADER
11 DRUM
12 SIPHON
P WET PAPER
W CONDENSED WATER

The invention claimed is:

1. A method for improving heating efficiency of steam, comprising:
   preparing an aqueous emulsion containing a condensed water film formation-suppressing amine and an emulsifier having hydrophilic-lipophilic balance of 12-16, and
   adding the aqueous emulsion containing the condensed water film formation-suppressing amine in a heating step of heating a material to be heated by a steam drier via a metallic material,
   wherein the aqueous emulsion condensing the condensed water film formation-suppressing amine is added in a steam at a steam pipe or a steam header for supplying the steam to the steam dryer that is disposed right before the steam dryer,
   the condensed water film formation-suppressing amine is added so that a concentration of the condensed water film formation-suppressing amine in the steam is 0.01 to 10 ppm, and
   two or more neutralizing amines having a pH-adjusting function are concurrently used together with the condensed water film formation-suppressing amine to reduce corrosion rate of the steam drier and steam pipe,

TABLE 1

|  | Chemical Agents Added※ | Steam Consumption Units before and after Addition of the Chemical Agents | | Steam Consumption Unit Reduction Rate (%) | Strainer Clogging |
|---|---|---|---|---|---|
|  |  | before the addition | after the addition |  |  |
| Example 1 | polyamine (0.4) | 2.94 | 2.81 | 4.4 | absent |
| Example 2 | polyamine (0.4) MEA(3.2) DEEA(2.2) | 3.14 | 2.95 | 6.1 | absent |
| Comparative Example 1 | octadecylamine (0.1) AMP(3.8) | 3.60 | 3.41 | 5.3 | present (cleaning) |

※A number indicated in parentheses is an amount added based on the amount of steam (ppm)

It is clear from Table 1 that according to the present invention, by using a specific polyamine, the heating efficiency of steam could further be improved. It is also clear that since no clogging of the strainer was present, stable operation in which the production efficiency had been raised could be continued in the papermaking facility and the like.

the neutralizing amines being added in an amount of 0.1 to 50 ppm based on an amount of steam,
wherein the condensed water film formation-suppressing amine is a polyamine represented by the following general formula (1):

$$R^1-[NH-(CH_2)_m]_n-NH_2 \qquad (1)$$

wherein $R^1$ represents a saturated or unsaturated hydrocarbon group having 10 to 22 carbon atoms; m is an integer of 1 to 8, and n is an integer of 1 to 7; and when n is 2 or more, a plurality of $NH-(CH_2)_m$ may be identical or different.

2. The method for improving the heating efficiency of steam according to claim 1, wherein the metallic material is rotating.

3. A papermaking method comprising a step of heating the steam for improving the heating efficiency of the steam according to claim 1, wherein an amount of the steam to be supplied to the steam dryer is adjusted based on an amount of a papermaking material in the papermaking facility and an amount of the steam used in the steam dryer.

4. The method for improving the heating efficiency of steam according to claim 1, wherein the emulsifier is a polyoxyethylenealkylamine whose alkyl group has 10 to 18 carbon atoms.

5. The method for improving the heating efficiency of steam according to claim 1, wherein the neutralizing amines are volatile amines.

6. The method for improving the heating efficiency of steam according to claim 1, wherein the two or more neutralizing amines consist of monoethanolamine and diethylethanolamine.

* * * * *